(12) United States Patent
Fischer et al.

(10) Patent No.: US 7,590,474 B2
(45) Date of Patent: Sep. 15, 2009

(54) METHOD AND DEVICE FOR SLOPE AND/OR PITCH RECOGNITION OF A VEHICLE

(75) Inventors: Norbert Fischer, Barwedel (DE); Matthias Klöpping, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 578 days.

(21) Appl. No.: 11/109,550

(22) Filed: Apr. 19, 2005

(65) Prior Publication Data
US 2006/0069467 A1    Mar. 30, 2006

(30) Foreign Application Priority Data
Apr. 21, 2004   (DE) .................. 10 2004 019 928

(51) Int. Cl.
*G05D 1/00* (2006.01)
(52) U.S. Cl. .................... 701/1; 701/70; 701/72; 701/75; 701/69; 180/197
(58) Field of Classification Search ............ 701/1, 701/70, 71, 72, 74, 75, 82, 69; 180/197; 280/757
See application file for complete search history.

(56) References Cited

U.S. PATENT DOCUMENTS

| 4,674,327 | A  | * | 6/1987 | Swindall et al. ............. 73/146 |
| 6,116,618 | A  |   | 9/2000 | Shono et al. ............ 280/5.501 |
| 6,374,171 | B2 | * | 4/2002 | Weiberle et al. ............ 701/71 |
| 2004/0236486 | A1 | * | 11/2004 | Krause et al. ................ 701/37 |

FOREIGN PATENT DOCUMENTS

| DE | 69806719 | 4/2003 |
| DE | 10256895 | 6/2003 |

* cited by examiner

*Primary Examiner*—Gertrude Arthur Jeanglaud
(74) *Attorney, Agent, or Firm*—King & Spalding L.L.P.

(57) ABSTRACT

In a method and a device for slope and/or pitch recognition in a vehicle (1, 1', 1'') at least one speed and a transverse and/or longitudinal acceleration of the vehicle are determined and a slope or pitch situation is assumed, when the speed is smaller than the limit value $v_{Glmax}$ and the transverse acceleration is greater than a limit value $a_{qmax}$ and/or the longitudinal acceleration is greater than a limit value $a_{lmax}$. On recognition of a slope or pitch situation, a ride control system can be automatically deactivated and/or control thresholds of the ride control system are expanded.

19 Claims, 2 Drawing Sheets

METHOD AND DEVICE FOR SLOPE AND/OR PITCH RECOGNITION OF A VEHICLE

CROSS-REFERENCE TO RELATED APPLICATION

This application claims priority to German Patent Application No. DE 10 2004 019 928.0, which was filed on Apr. 21, 2004, and is incorporated herein by reference in its entirety.

TECHNICAL FIELD

The invention concerns a method and device for slope and/or pitch recognition of a vehicle.

BACKGROUND

Modern vehicles, and especially all-terrain vehicles, are designed with ride control systems, for example, in order to compensate for level differences caused by road or terrain roughness. For this purpose, the ride control system comprises adjustment devices to adapt the level position of a vehicle, which are designed, for example, as pneumatic springs, and are operated by a compressor. In addition, the ride control system includes slope and/or distance sensors, so-called vehicle height sensors, to record the distance to the road base. The data of these sensors are evaluated by a control device and the compressor is driven, so that it operates the pneumatic springs, so that a level position set as reference value is adjusted.

The processes for stabilization of the vehicle parallel to the plane of the roadway require time. This can mean that the vehicle loses ground clearance in the transition from a sharply sloping section of road to a flat section of road.

A determination device is known, for example, from DE 698 06 719 T2, to determine the gradient of a section of road, and to reactivate the ride control system, if necessary. If the determination device finds that a recorded acceleration is lower than a predetermined acceleration and a recorded vehicle height has shifted by at least a predetermined value relative to a reference level position, it is then determined that the vehicle is on a sloped road. The determination device, known from DE 698 06 719 T2, is based on the assumption that it is impossible for an ordinary vehicle on a steeply sloped section to travel at medium or high speed.

Instead of a determination device, slope sensors to determine a gradient are conceivable. Such sensors, however, have a complicated design and are consequently expensive to produce.

SUMMARY

The technical problem underlying the invention is therefore to devise a method and apparatus for improved slope and/or pitch recognition of a vehicle.

The solution to this technical problem can be obtained by a device for slope and/or pitch recognition in the vehicle, comprising means for determining at least one speed and/or transverse and/or longitudinal acceleration of the vehicle, and means for displaying a slope or pitch situation when the speed is smaller than a limit value $v_{Glmax}$ and the transverse acceleration is greater than a limit value $a_{qmax}$ and/or the longitudinal acceleration is greater than a limit value $a_{lmax}$.

A lowering and/or raising on at least one wheel and/or one axle can be determined by a vehicle height sensor and considered for determination of a slope and/or pitch situation. Speed and/or acceleration signals can be transmitted to a ride control system via a vehicle bus. On recognition of a slope and/or pitch situation and/or off-road operation, the ride control system can be automatically deactivated and/or the control thresholds of the ride control system expanded. On recognition of a slope or pitch situation and/or off-road operation, the vehicle can be adjusted to or below a minimal limit speed $v_{Glmin}$. Off-road operation of the ride control system can be manually determined by a driver. An off-road mode of the ride control system can be automatically recognized, when all-wheel drive is switched to a gear reduction. A set reference level position can be fixed, a driving dynamic limit speed $v_{limit}$ can be allocated to the reference level position, and then this dynamic limit speed cannot be surpassed. The adjustment devices of the ride control system can be designed as pneumatic springs.

The object can also be achieved by a method for slope and/or pitch recognition in the vehicle, comprising the steps of determining at least one speed and/or transverse and/or longitudinal acceleration of the vehicle, and determining a slope or pitch situation, when the speed is smaller than a limit valve $v_{Glmax}$ and/the transverse acceleration greater than a value $a_{qmax}$ and/or the longitudinal acceleration greater than a limit value $a_{lmax}$.

Lowering and/or raising on at least one wheel and/or axle can be determined by a vehicle height sensor and considered for determination of the slope and/or pitch situation. Speed and/or acceleration signals can be transmitted to a ride control system via a vehicle bus. On recognition of slope or pitch situation and/or off-road operation, a ride control system can be automatically deactivated and/or control thresholds of the ride control system can be expanded. On recognition of a slope or pitch situation and/or off-road operation, the vehicle can be adjusted to or below a minimal limit speed $v_{Glmin}$. A driver may manually determine off-road operation of the ride control system. An off-road mode of the ride control system can be automatically recognized, when an all-wheel drive is switched to a gear reduction. A set reference level position can be fixed, a driving dynamic limit speed $v_{limit}$ can be allocated to the reference level position and then this dynamic limit speed can not be surpassed.

For this purpose, a speed and transverse and/or longitudinal acceleration of a vehicle are determined. A slope or pitch situation is assumed, if the speed is smaller than a limit value $v_{Glmax}$ and the transverse acceleration is greater than a limit value $a_{qmax}$ and/or the longitudinal acceleration is greater than a limit value $a_{lmax}$. It is then conceivable to define several limit values $v_{Glmax}$, for example, for reverse and forward travel, and/or to distinguish from uphill and downhill travel. Speed-dependent or fixed limit values $a_{qmax}$ and/or $a_{lmax}$ are then assigned to each limit value $v_{Glmax}$. Reverse travel of the vehicle can be considered by the amounts.

In a preferred variant, lowering and/or raising on at least one wheel and/or axle is determined by a vehicle height sensor and considered for determination of the slope and/or pitch situation. During uphill travel, the rear axle of a vehicle is lowered, because of a shift in center of gravity, and the front axle is raised. During downhill travel, the conditions reverse, so that the front axle is lowered and the rear axle raised. Recording of a slope or a pitch situation can be further improved by this information.

In a preferred variant, speed and/or acceleration signals of a ride control system are made available via a vehicle bus. The vehicle bus, for example, is a CAN-bus or a FlexRay-bus. Speed and/or acceleration signals are used for a number of programs to improve driving dynamics, for example, ESP and/or ASR. The signals are recorded at an appropriate location and made available to further application via the vehicle bus.

In another preferred variant, on recognition of a slope and/or pitch situation and/or off-road operation, the ride control system is automatically deactivated and/or the control thresholds of the ride control system are expanded. By expanding the control thresholds, regulation is only carried out at greater level deviations. Deactivation preferably occurs after a reference level position has been adjusted and/or fixed. Adjustment of the reference level position is then also understood to mean a process, where an actual level position is assumed as reference level position. During travel off-road or on a rough roadway, automatic ride leveling continuously attempts to compensate for the height differences on the individual wheels. With alternating spring deflection of the wheels on passing through an alternating uphill-downhill section, the result of stabilization is that, from one moment to the next, the height differences are precisely opposed to the requirements, i.e., a ground clearance on one wheel just stabilized is too low on this wheel in the next moment. The ride control system is therefore of no use and leads only to strong loading of the control devices. According to the invention, after an adjustment process, the vehicle remains in a specific level, so that the driver can adjust to a corresponding road clearance that no longer varies by intermediate control processes.

In another variant, on recognition of a slope or pitch situation and/or off-road operation, the vehicle is adjusted to or below a minimal limit speed $v_{Glmin}$. Below a minimal limit speed $v_{Glmin}$, a time delay of the control processes is without significance, so that ride leveling is also permitted in off-road operation and/or in a slope and/or pitch situation. If a speed, however, lies well above the minimal limit speed $v_{Glmin}$, adjustment to the minimal limit speed $v_{Glmin}$ has an adverse effect on the driving comfort more strongly than deactivation of the ride control system. The limit speed $v_{Glmin}$ is preferably determined as a function of a reference level position.

In another preferred variant, off-road operation of the ride control system can be determined manually by a driver. The vehicle is designed for this purpose with an input and/or output unit. Additional stipulations for the ride control system can be entered manually, preferably through the input and/or output unit. For example, a driver can stipulate a desired reference level.

In another variant, a terrain mode of the ride control system can be automatically recognized, when the driver switches an all-wheel drive into gear reduction, the so-called "low range".

In another variant, on recognition of the speed greater than $V_{Glmax}$, the speed is adjusted and the reference level position adjusted and fixed. The speed $V_{Glmax}$ is then at least dependent on the reference level position. At higher level positions, the problem is posed that the center of gravity of the vehicle is shifted upward. This can lead to a stability problem at high vehicle speed, so that there is a hazard of rollover of the vehicle. By adjusting to limit speeds $v_{Glmax}$, critical driving dynamic states are avoided. It is also conceivable to automatically adjust to a lower level automatically, in order to avoid this problem, on surpassing a limit speed $v_{Glmax}$. However, the control devices and/or the adjustment devices of the ride control system are then often stressed needlessly, which reduces the lifetime of the control devices and/or the adjustment devices and represents an unnecessary noise burden for the driver. Limitation of the speed preferably occurs through an engine control device and/or an electrical stability program, since the speed can be very easily limited there and/or the speeds are already available for the level positions.

In a preferred variant, the adjustment devices are designed as pneumatic springs and the control device as a compressor.

BRIEF DESCRIPTION OF THE DRAWINGS

The invention is further explained below by means of a preferred practical example. In the figures.

DETAILED DESCRIPTION

Figure 1:
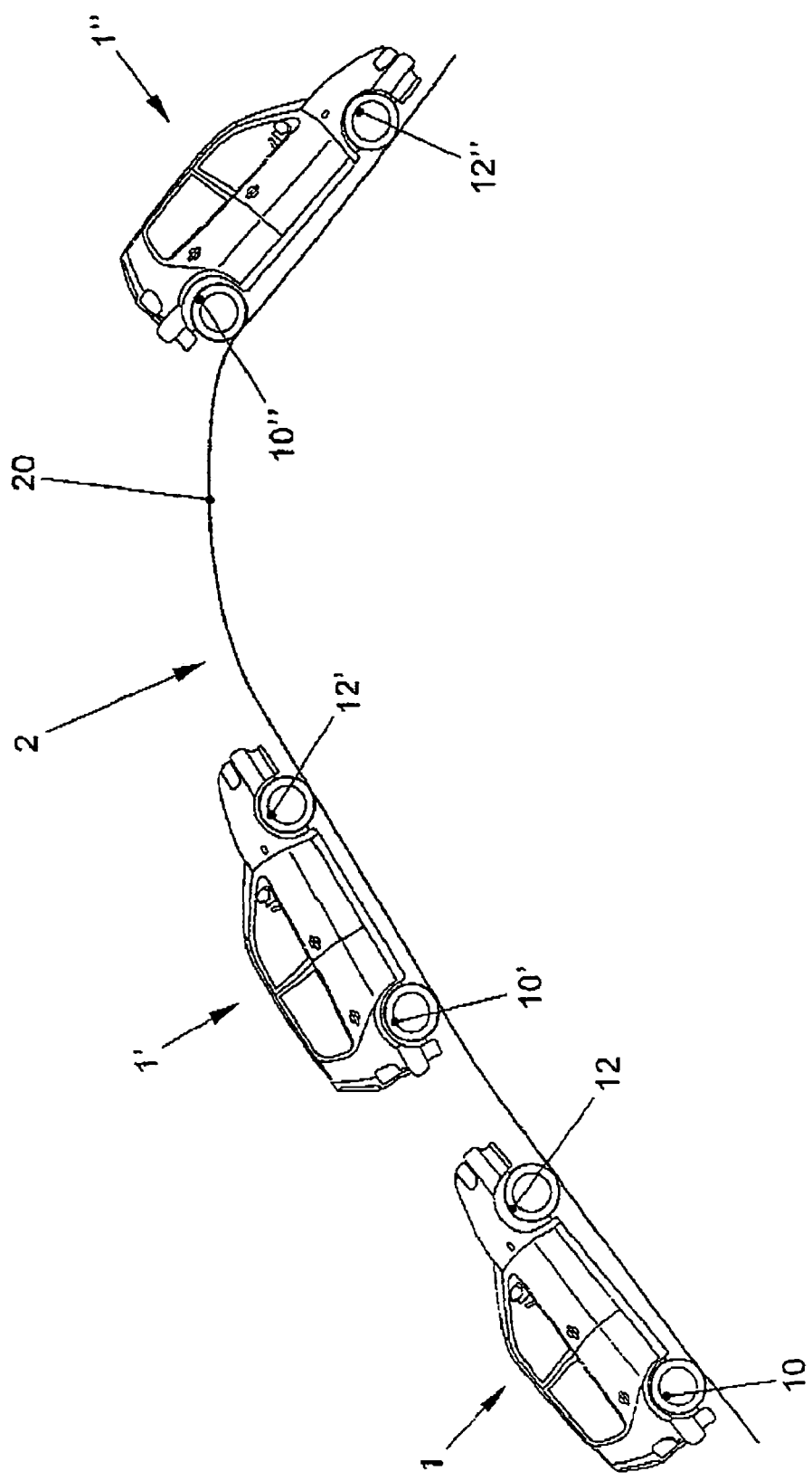
FIG. 1 shows vehicles with ride leveling on a strong slope.
Figure 2:
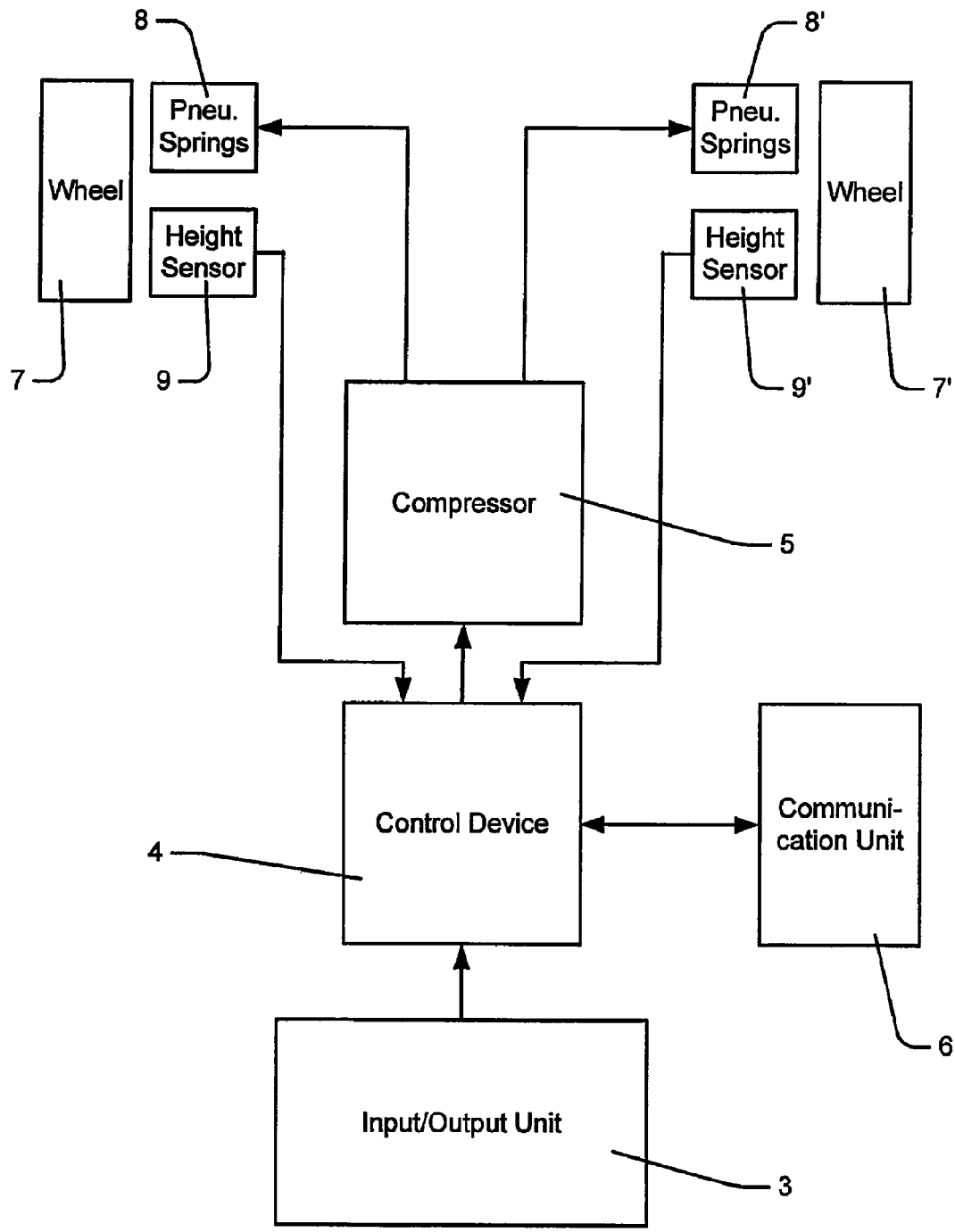
FIG. 2 shows a schematic block diagram of a device for automatic ride leveling.

FIG. 1 shows vehicles 1, 1', 1" with ride control systems, depicted in FIG. 2, on a strong slope. A shift in center of gravity of vehicle 1 occurs, because of the slope. The shift in center of gravity causes suspension processes, so that a rear axle 10 of vehicle 1 lowers and a front axle 12 rises. The ride control system of vehicle 1 recognizes the suspension processes and attempts to adjust the vehicle 1 parallel to a roadway plane 2. The ride control system includes pneumatic springs and compressors (not shown) for this purpose. If this condition persists for a longer time, the ride control system controls, so that the pneumatic spring of the front axle 12 is vented and the front axle 12 is therefore lowered, and the pneumatic spring of the rear axle 10 is filled and the rear axle 10 is therefore raised. FIG. 1 also shows the vehicle 1' with rear axle 10' and front axle 12', which is adjusted parallel to the roadway plane 2. If the driver drives over the depicted hillcrest 20, the conditions reverse. Vehicle 1" has already driven over the hill crest 20. A front axle 12" of vehicle 1" then lowers and a rear axle 10" is raised. Because of the still present reinforcement by ride leveling, this movement of vehicle 1" can be stronger than in a vehicle without ride leveling. This can mean that the vehicle 1" loses ground clearance and even strikes the ground under some circumstances. Naturally, the ride leveling readjusts this state with a certain time delay.

In order to avoid loss of road clearance on passing over a hill crest and/or on transition from a slope into a flat section of road, the ride leveling according to the invention, in recognition of a strong slope or a strong pitch, can be automatically deactivated. A pitch or slope is recognized, when the vehicle speed lies below a limit value $v_{Glmax}$ and the transverse acceleration is greater than the limit value $a_{qmax}$ and/or the longitudinal acceleration is greater than a limit value $a_{lmax}$.

Non-critical terrain situations are recognizable, when the transverse acceleration is smaller than a limit value $a_{qmin}$ and a longitudinal acceleration smaller than a limit value $a_{lmin}$.

If the vehicle 1' travels with a speed less than or equal to a minimal limit speed $v_{Glmin}$ over hillcrest 20, sufficient time remains for ride leveling, regardless of the slope of the terrain, to prevent a loss of ground clearance.

In order to avoid a situation, in which ride leveling continuously seeks to compensate for the continuously changing ground conditions during off-road operation, ride leveling is deactivated in off-road operation or the control thresholds are broadened. This means that an intervention still occurs at a maximum during strong level deviations.

FIG. 2 shows a device for automatic ride leveling. The device for automatic ride leveling includes an input and output unit 3, a control device 4, a compressor 5, a communications unit 6, pneumatic springs 8, 8', allocated to vehicle wheels 7, 7', and the vehicle height sensors 9, 9', allocated to the vehicle wheels 7, 7'. Preferably, one pneumatic spring and one height sensor is allocated to each of the four wheels of the vehicle. However, it is also conceivable to allocate only one pneumatic spring and/or one vehicle height sensor to a front and/or rear axle of the vehicle.

The driver can switch a ride control system into an off-road mode and/or adjust a desired reference level position, and optionally fix it via the input and output unit 3. In addition, the driver can have the set level position displayed. The mode and/or the set reference level position are transmitted to the control device 4 via the input and output unit 3. The control device 4 determines, from the data of the vehicle height sensors 9, 9', an actual level position and controls the compressor 5 accordingly, which inflates or deflates the pneumatic springs 8, 8', so that the desired reference level position is reached. The control thresholds are then broadened in the off-road mode.

If the driver switches the all-wheel drive into a gear reduction, this information is conveyed to the control device 4 via the communications unit 6, so that the ride control system switches to off-road mode.

As already explained, control processes are not carried out, when the vehicle speed lies below a limit value $v_{Glmax}$ and the transverse acceleration is greater than a limit value $a_{qmax}$ and/or the longitudinal acceleration is greater than a limit value $a_{lmax}$. Speed and acceleration signals are recorded by an electronic stability program, and transmitted to the communications unit 6 via a CAN-bus. Because of this, they are available to control device 4.

Control processes are permitted again, when off-road operation is left or the vehicle speed lies below the minimal limit speed $V_{Glmin}$ or the transverse acceleration is smaller than the limit value $a_{qmin}$ and the longitudinal acceleration is smaller than limit value $a_{lmin}$.

The ride control system preferably distinguishes five reference level positions: "off-road", "high", "normal", "low" and "loaded". However, a step-less adjustment of the reference level positions is also conceivable.

If the reference level position "high" is set, driving dynamic adjustment of the actual level position to an actual speed made available by the communications unit 6 can occur. If the set level position should lead to instabilities at the actual speed, the actual level position can be adjusted downward. However, in order to avoid a strong load on the pneumatic springs 8, 8' and/or compressor 5, it is possible to fix specific reference level positions.

If, for example, the reference level position "high" is fixed, this control command is transmitted to the control device 4 and, from there, to an engine control device (not shown) or directly to the engine control device via the communications unit 6. Based on this control command, the engine control device controls the speed of the vehicle to a driving dynamic limit speed $v_{limit}$, at which the vehicle is still stable at the selected level position. Since the driving dynamic limit speed therefore cannot be surpassed, the level position must also not be adjusted for driving dynamic reasons.

In the level position "off-road", a specific level position that the driver has set can be fixed. The vehicle remains in the specified level position after an adjustment process, so that the driver can set the corresponding ground clearance, which no longer changes from intermediate control processes. The vehicle therefore behaves like a vehicle with unregulated chassis. A limit speed can also be allocated to the fixed level position, in which, however, this is not necessary in the control case. The limit speed for the selected level position "off-road" need not be the same as the limit speed at the fixed level position "high".

What is claimed:

1. An apparatus comprising:
    a ride control system configured to:
        determine a status of at least one of:
            a speed of a vehicle;
            a transverse acceleration of the vehicle;
            a longitudinal acceleration of the vehicle; and
            determining a slope or pitch of the vehicle when:
                the speed is less than a limit value $v_{Glmax}$; and at least one of:
                    the transverse acceleration is greater than a limit value $a_{qmax}$; and
                    the longitudinal acceleration is greater than a limit value $a_{lmax}$
    wherein based at least on the determined slope or pitch adjusting the speed of the vehicle to at most a minimal limit speed $V_{Glmin}$.

2. An apparatus according to claim 1, wherein the ride control system is further configured to:
    adjust at least one of:
        a wheel of the vehicle;
        an axle of the vehicle; and
    wherein determining a slope or pitch of the vehicle is based at least on the adjusted wheel or axle.

3. An apparatus according to claim 1,
    wherein determining the status at least one of the speed of the vehicle, the transverse acceleration of the vehicle, the longitudinal acceleration of the vehicle comprises receiving a speed or acceleration signal from a vehicle bus coupled to the ride control system.

4. An apparatus according to claim 1, wherein based at least on the determined slope or pitch, deactivating the ride control.

5. An apparatus according to claim 4, wherein deactivating the ride control system is further determined by a driver operating the vehicle in an off-road operation.

6. An apparatus according to 5, wherein the ride control system is further configured to detect the off-road operation when the vehicle is switched from all-wheel drive to a gear reduction.

7. An apparatus according to claim 4, wherein deactivating the ride control system comprises deactivating control thresholds of the ride control system.

8. An apparatus according to claim 1, wherein the ride control system is further configured to set a reference level position for limiting the speed of the vehicle.

9. An apparatus according to claim 2, further comprising pneumatic springs configured to adjust the wheel of the vehicle or the axle of the vehicle.

10. A method comprising:
    determining at least one of:
        a speed of a vehicle;
        a transverse acceleration of the vehicle;
        a longitudinal acceleration of the vehicle; and
    determining a slope or pitch of the vehicle, when
        the speed is smaller than a limit value $V_{Glmax}$; and at least one of: the
            transverse acceleration is greater than a limit value $a_{qmax}$; and
            the longitudinal acceleration is greater than a limit value $a_{lmax}$
    wherein based at least on the determined slope or pitch situation adjusting the speed of the vehicle to at most a minimal limit speed $v_{Glmin}$.

11. A method according to claim 10, further comprising adjusting at least one of:
    a wheel of the vehicle;
    an axle of the vehicle; and wherein determining a slope or pitch of the vehicle is based at least on the adjusted wheel or axle.

12. A method according to claim 10, wherein determining a speed and acceleration comprises receiving signals from a vehicle bus coupled to a ride control system.

13. A method according to claim 10, wherein based at least on the determined slope or pitch, deactivating a ride control system.

14. A method according to claim 10, further comprising configuring a ride control system when the vehicle operates in an off-road operation.

15. A method according to claim 10, further comprising setting a reference level position for limiting the speed of the vehicle.

16. A method according to 14, further comprising determining when the vehicle transitions from all-wheel drive to a gear reduction.

17. A method according to 14, wherein a driver can determine the off-road operation of the ride control system.

18. A method according to claim 13, wherein deactivating the ride control system comprises adjusting control thresholds of the ride control system.

19. A method according to claim 13, further comprises deactivating the ride control system if the vehicle is operating in an off-road operation.

\* \* \* \* \*